United States Patent

Yoshida

[19]

[11] Patent Number: 6,053,024
[45] Date of Patent: Apr. 25, 2000

[54] METHOD OF FORMING A TURBINE SHELL OF A TORQUE CONVERTER BY PRESS WORKING

[75] Inventor: Satoshi Yoshida, Neyagawa, Japan

[73] Assignee: Exedy Corporation, Osaka, Japan

[21] Appl. No.: 09/146,345

[22] Filed: Sep. 3, 1998

[51] Int. Cl.$^7$ ........................................... B21K 1/26
[52] U.S. Cl. ............................................... 72/379.2
[58] Field of Search ........................... 72/348, 356, 379.2

[56] References Cited

U.S. PATENT DOCUMENTS

| | | | |
|---|---|---|---|
| 1,915,102 | 6/1933 | Rehbein | 72/348 |
| 2,495,402 | 1/1950 | Bentsen | 72/379.2 |
| 4,061,098 | 12/1977 | Horie et al. | 72/379.2 |
| 4,825,521 | 5/1989 | Frötschner et al. | 29/156.4 R |

FOREIGN PATENT DOCUMENTS

| | | |
|---|---|---|
| 4294860 | 4/1994 | Germany . |
| 2108411 | 5/1983 | United Kingdom . |

*Primary Examiner*—Lowell A. Larson
*Attorney, Agent, or Firm*—Shinjyu Global IP Counselors, LLP

[57] ABSTRACT

A method of press forming a turbine shell 5a is provided for suppressing the reduction in thickness of a radially inner corner portion 52 of the turbine shell 5a without increasing a radius of the radially inner corner portion 52. The preferred method of forming the turbine shell 5a with the radially inner corner portion 52 is performed by bending a thin sheet material or plate with a press in basically a first preliminary pressing operation and second finish pressing operation. In the preliminary pressing operation, the thin sheet material or plate is subjected to compressive force to provide a preliminary form having a radially inner corner portion 52, a blade-carrying portion 51 and a flat portion 53. The blade-carrying portion 51 extends radially outward from the radially inner corner portion 52. The flat portion 53 extends radially inward from the radially inner corner portion 52. During the preliminary pressing operation, the compressive force is applied to form the radially inner corner portion 52, which is longer than the finished form of the radially inner corner portion 52. During the finish pressing operation, the preliminary form of the radially inner corner portion 52 is subjected to a pressing force, which generates a compressive force in the preliminary form of the radially inner corner portion 52. The compressive force generated in the corner portion 52 is directed in a direction substantially transverse to a direction of the thickness of the radially inner corner portion 52. In other words, the thickness of the corner portion 52 is reduced during the preliminary pressing operation and then increased during the finish pressing operation.

15 Claims, 2 Drawing Sheets

METHOD OF FORMING A TURBINE SHELL OF A TORQUE CONVERTER BY PRESS WORKING

BACKGROUND OF THE INVENTION

1. Field of the Invention

This invention generally relates to a method of forming a turbine shell of a torque converter by press working or stamping a sheet material. More specifically, the present invention relates to a method of forming a radially inner corner portion of the turbine shell by bending the sheet material.

2. Background Information

Torque converters usually include a fluid coupling mechanism for transmitting torque between a crankshaft of an engine and an input shaft of an automatic transmission. A torque converter has three types of runners or vane wheel members (e.g., impeller, turbine and stator) which work together for transmitting the torque from the crankshaft of the engine to the input shaft of the transmission by the movement of an internal hydraulic oil or fluid. The impeller is fixedly coupled to the front cover that receives the input torque from the crankshaft of the engine. The hydraulic chamber formed by the impeller shell and the front cover is filled with hydraulic oil. The turbine is disposed opposite the front cover in the hydraulic chamber. The turbine is fixedly coupled to the transmission. When the impeller rotates, the hydraulic oil flows from the impeller to the turbine, and the turbine rotates. As a result, the torque is transmitted from the impeller to the turbine, which in turn transmits the torque to rotate the main drive shaft of the transmission.

In recent years, to improve fuel efficiency, some torque converters have included lock-up devices that, upon reaching predetermined operating conditions, lock-up the torque converters so that power from the crankshaft of an engine is directly transmitted to the automatic transmission. Thus, lock-up devices bypass the fluid coupling device. Upon engagement, lock-up devices often cause a shudder, or vibration. Further, while engaged, the lock-up device is subjected to vibrations caused by sudden acceleration, or deceleration, or other vibrations including circumstances associated with internal combustion engines. Consequently, torsional vibration dampening apparatuses are typically employed in lock-up mechanisms to dampen vibration.

The lock-up clutch is disposed in the space between the front cover and the turbine. As mentioned above, the lock-up clutch is a mechanism to directly transmit the torque between the crankshaft of the engine and the drive shaft of the transmission by mechanically coupling the front cover and the turbine. The lock-up clutch includes primarily a piston and an elastic coupling mechanism to connect the piston to the members on the power output side of the turbine. The piston is disposed to divide the space between the front cover and the turbine into a first hydraulic chamber on the front cover side and a second hydraulic chamber on the turbine side. As a result, the piston can move close to and away from the front cover by the pressure difference between the first hydraulic chamber and the second hydraulic chamber. A friction joining member covered by friction facing is typically formed on the outer periphery of the front cover on the axial surface facing the piston. When the hydraulic oil in the first hydraulic chamber is drained and the hydraulic pressure in the second hydraulic chamber increases in pressure, the piston moves toward the front cover side. This movement of the piston causes the friction facing of the piston to strongly press against the friction surface of the front cover.

The elastic coupling mechanism functions as a torsional vibration dampening mechanism to dampen vibration in the lock-up clutch. The elastic coupling mechanism includes, for example, a drive member fixedly coupled to the piston, a driven member fixedly coupled to the turbine side, and an elastic member, such as one or more coil springs, disposed in between the drive member and the driven member to enable torque transmission.

When the lock-up clutch is engaged, the hydraulic oil in the first hydraulic chamber is drained from its inner circumferential side and the hydraulic oil is supplied to the second hydraulic chamber. As a result, the hydraulic pressure in the second hydraulic chamber becomes greater than the hydraulic pressure in the first hydraulic chamber. This pressure differential between the first and second hydraulic chambers causes the piston to move toward the front cover.

The turbine shell is a component of the torque converter, which is typically formed by press working or stamping a sheet metal material. The turbine shell generally has a plate thickness ranging from approximately 1.4 mm to approximately 1.6 mm. The turbine shell is typically provided at its radially inner portion with a curved inner corner portion having a radius of approximately 2 mm or less.

When the turbine shell is formed with a curved inner corner portion by using prior art methods of press working or stamping, an internal tensile stress occurs in a direction substantially perpendicular to the direction of the thickness of the plate so that the radially inner curved portion expands. This bending operation results in reduction of the thickness of the radially inner corner portion of the turbine shell. More specifically, the thickness of the curved inner corner portion is reduced by approximately 15–25% from that of the original thickness of the material.

The turbine shell is subjected to an inner pressure of the working fluid of the torque converter. Accordingly, even a local reduction in thickness of the turbine shell may cause expansive deformation, and therefore may cause damages and/or disengagement of parts. In the turbine shells of the prior art, thicker materials have been used in order to avoid the disadvantages caused by the reduction in strength and rigidity due to reduction in thickness. However, the use of a thick material increases the manufacturing cost as well as the weight of the torque converter.

It is necessary to provide a predetermined space between the radially inner corner portion of the turbine shell and the stator for forming a passage of working fluid. In many cases, the radius of the radially inner corner portion of the turbine shell is generally restricted to approximately 2 mm or less in order to ensure a high accuracy in size of this space and to improve the efficiency of flow of the working fluid.

In view of the above, there exists a need for a method of forming a turbine shell with a corner portion which overcomes the above mentioned problems in the prior art. This invention addresses this need in the prior art as well as other needs, which will become apparent to those skilled in the art from this disclosure.

SUMMARY OF THE INVENTION

An object of the present invention is to provide a method of press forming a radially inner corner portion of a turbine shell with minimal reduction in the thickness of the radially inner corner portion of the turbine shell without increasing the radius of the radially inner corner portion.

Another object of the present invention is to use a thin material plate to form a turbine shell without reducing the strength and the flow efficiency of the working fluid so that manufacturing costs and the weight of the torque converter can be reduced.

According to a first aspect of the present invention, a method of forming a turbine shell having a corner portion by performing bending with a press includes first and second pressing operations. In the first operation, a preliminary pressing is performed to provide a turbine shell with a preliminary form such that a compressive force can be applied to the corner portion in a direction substantially perpendicular to the direction of the thickness of the corner portion in the second step. In the second operation, finish pressing is performed to increase the thickness of the corner portion by axially compressing the corner portion.

According to the above mentioned method, the step before the finish pressing is performed to provide the turbine in preliminary form, which will cause the compressive force applied to the corner portion in the direction crossing the direction of its thickness during the finish pressing. Therefore, it is possible to suppress reduction in thickness of the corner portion in the second step for the finish pressing. This allows use of a thinner material than the prior art, while maintaining strength and an efficiency of working fluid, and therefore a manufacturing cost and a weight of the torque converter can be reduced.

According to a second aspect of the present invention, the method of forming the turbine shell of the first aspect of the present invention further has such features that the finished turbine shell has an annular form. The finished turbine shell has the radially inner corner portion, a blade-carrying portion extending radially outward from the radially inner corner portion, and a flat portion extending radially inward from the radially inner corner portion. In the first pressing operation, the pressing is performed to provide the blade-carrying portion and the flat portion each having a finished form as well as the radially inner corner portion having a longer size than an intended finish size.

In this aspect of the present invention, the radially inner corner portion processed in the first step has a longer size than the intended finished size so that the turbine shell formed in the first step has the form in which a compressive force can be applied to the radially inner corner portion in the direction crossing the direction of the thickness during the finish pressing. Although the compressive force crossing to the direction of the thickness of the turbine shell occurs during the finish pressing, the preliminary pressing is performed to provide the blade-carrying portion and the flat portion having the finished forms, respectively, so that the accuracies of sizes and forms of the blade-carrying portion and others can be improved.

According to a third aspect of the present invention, the turbine shell, which is formed in accordance with the methods of the first or second aspects of the present invention, results in a turbine shell having a radius of approximately 2 mm or less and a thickness of approximately 10% or less from the thickness of the turbine shell. Under the same or similar conditions, the thickness of the corner portion is reduced by approximately 15–25% in the prior art. However, the forming method of the present invention can provide the reduction rate of approximately 10% or less, which allows use of a thinner material plate.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
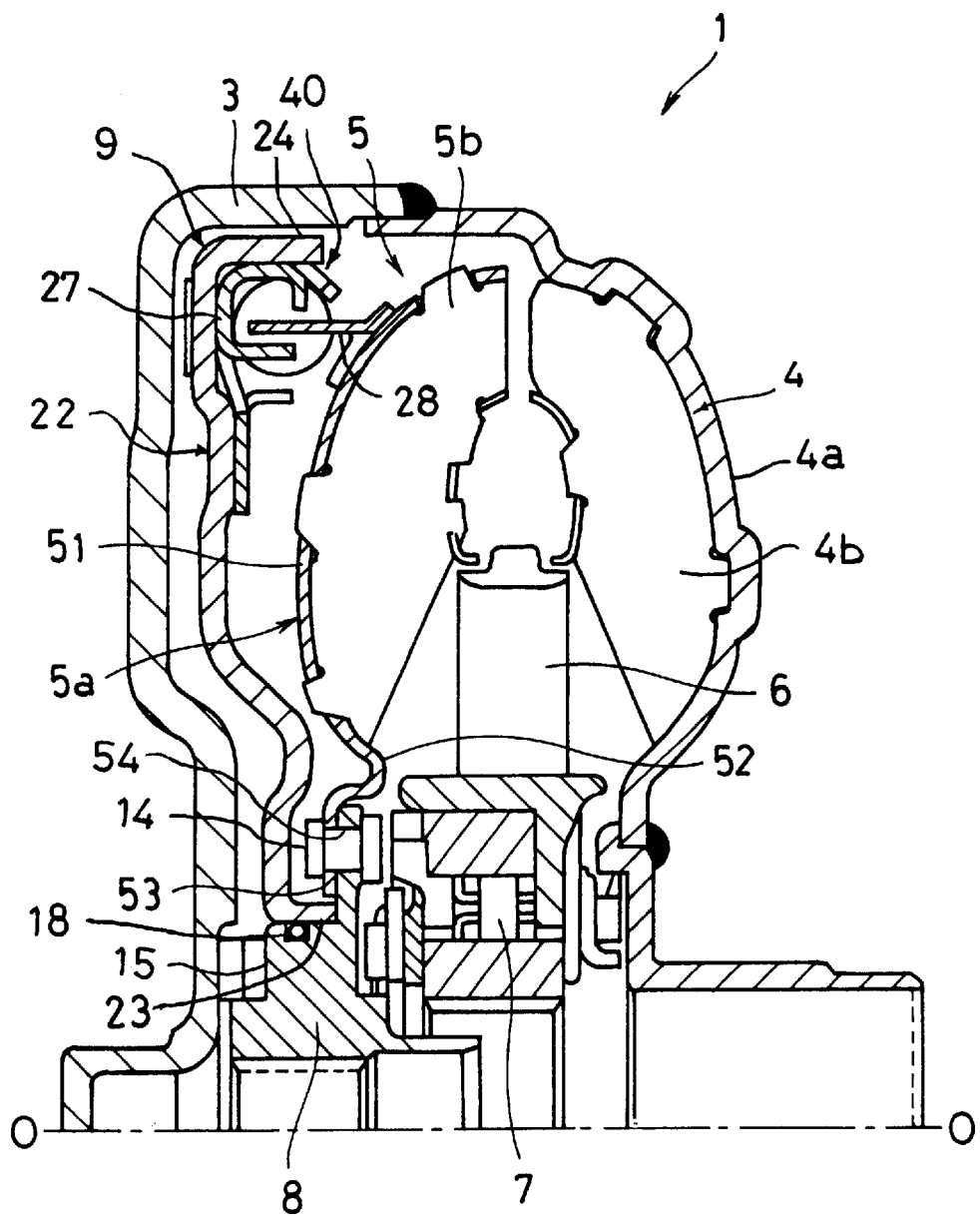
FIG. 1 is a partial, longitudinal schematic cross-sectional view of a torque converter with a turbine shell formed in accordance with one embodiment of the present invention.

Referring initially to FIG. 1, a torque converter 1 is illustrated in accordance with one embodiment of the present invention. The torque converter 1 is especially adapted to be used in motor vehicles. In particular, the torque converter 1 is a mechanism for transmitting torque from a crankshaft (not shown) of an engine (not shown) and a main drive shaft (not shown) of a transmission (not shown). The engine is positioned to the left of the torque converter 1 as viewed in FIG. 1, while the transmission is positioned to the right of the torque converter 1 as viewed in FIG. 1. The centerline O—O illustrated in FIG. 1 represents the axis of rotation of the torque converter 1.

As shown in FIG. 1, the torque converter 1 basically includes a front cover 3 on the input side, an impeller 4 on the output side, a turbine 5, a stator 6, a one-way clutch 7, a turbine hub 8 and a lock-up clutch 9. The front cover 3 is configured for being coupled to the crankshaft of the engine through a flexible plate. The turbine 5 has a turbine shell 5a with a plurality of turbine blades 5b fixedly coupled to the inner side of the turbine shell 5a. The front cover 3 and the impeller 4 are welded together at their outer peripheral portions to form a working fluid chamber between them.

The impeller 4 forms a hydraulic fluid chamber together with the front cover 2. The turbine 5 opposes the impeller 4 within the hydraulic fluid chamber. The stator 6 is disposed between the impeller 4 and the turbine 5. The lock-up clutch 9 is disposed in the hydraulic fluid chamber so as to divide the space between the front cover 3 and the turbine 5 into a first hydraulic chamber (left side of the piston as viewed in FIG. 1) and a second hydraulic chamber(right side of the piston as viewed in FIG. 1).

The impeller 4 is constructed from the impeller shell 4a and the impeller plates 4b. The impeller shell 4a is fixedly coupled to the outer projection of the front cover 3. The front cover 3 can be installed to the structural components of the engine, which are not shown, so that the torque from the engine is transmitted to the front cover 3. The impeller shell 4a has a plurality of impeller blades 4b. The impeller blades 4b are fixedly coupled to the interior of the impeller shell 4a.

The turbine 5 is disposed at the position opposite the impeller 4 in the hydraulic chamber. The turbine 5 is constructed from the turbine shell 5a and the plurality of turbine blades 5b. The turbine blades 5b are fixedly coupled to the surface of turbine shell 5a. The inner periphery of the turbine shell 5a is fixedly coupled to the flange 15 of the turbine hub 8 by the rivets 14. The turbine hub 8 has a central bore with a plurality of spline grooves for coupling the main drive shaft (not shown) of the transmission to its interior.

The stator 6 is disposed between the radially inside of the impeller 4 and the interior of the turbine 5. The stator 6 controls the direction of the hydraulic oil returned from the turbine 5 to the impeller 4 to regulate a torque ratio. The stator 6 is supported on a fixed shaft (not shown) extending from the transmission by the oneway clutch 7.

The lock-up clutch 9 is disposed in the space between the front cover 3 and the turbine 5. The lock-up clutch 9 is a structure for mechanically coupling the front cover 3 to the turbine 5. The lock-up clutch 9 primarily includes a piston 22 and an elastic coupling mechanism 40 for elastically coupling the piston 22 to the turbine 5.

The piston 22 is a disk-shaped member disposed to divide the space between the front cover 3 and the turbine shell 5a into the first hydraulic chamber located adjacent the front cover 3 and the second hydraulic chamber located adjacent the turbine 5. The piston 22 is preferably constructed of a thin metal plate. The piston 22 has an inner tubular or cylindrical portion 23 and an outer tubular or cylindrical portion 24. The inner tubular portion 23 of piston 22 extends toward the transmission side of the torque converter 1 at its inner circumferential portion. The inner tubular portion 23 of piston 22 is supported to allow relative motion in the axial direction and the circumferential direction on the outer surface of the flange 15 of the turbine hub 8. The piston 22 can approach and leave the front cover 3 according to the differential pressure between the first and second hydraulic chambers.

A seal ring 18 is disposed between the inner tubular portion 23 of piston 22 and the flange 15 of the turbine hub. In particular, the seal ring 18 is located in a groove formed on the outer surface of the flange 15 of the turbine hub for sealing the inner peripheries of the first hydraulic chamber and the second hydraulic chamber.

The elastic coupling mechanism 40 is disposed between the piston 22 and the turbine 5. More specifically, the elastic coupling mechanism 40 is disposed between the outer peripheral portion of the piston 22 and the outer peripheral portion of the turbine shell 5a. The elastic coupling mechanism 40 basically includes a retaining plate 27 as a part of the drive member, a driven plate 28 as a part of the driven member, and a plurality of coil springs 30, which are disposed between both the plates 27 and 28. The retaining plate 27 is an annular plate member, which is disposed on the transmission side of the outer peripheral portion of the piston 22. Specifically, the retaining plate 27 is disposed on the inner periphery of the outer tubular portion 24. The interior of the retaining plate 27 is fixedly coupled to the piston 22 by a plurality of rivets (not shown). The retaining plate 27 not only holds the coil springs 30, but also transmits the torque by coupling both ends of the coil springs 30 in the circumferential direction.

The turbine 5 is formed of a turbine shell 5a and a plurality of turbine blades 5b fixedly coupled to the inner side of the turbine shell 5a. The turbine shell 5a is formed of a blade-carrying portion 51, a radially inner corner portion 52 and a flat portion 53. The blade-carrying portion 51 is opposed to the impeller 4. The radially inner corner portion 52 is formed radially inside the blade-carrying portion 51. The radius of the inner corner portion 52 must be approximately 2 mm or less in order to improve the efficiency of the flow of the working fluid. The flat portion 53 extends radially inward from the radially inner corner portion 52. The flat portion 53 is fixedly coupled to a turbine hub 8 by rivets 14 inserted through circumferentially spaced several apertures or holes 54. The turbine hub 8 has a spline aperture at its center. The turbine hub 8 is coupled through the spline aperture to a main drive shaft extending from the transmission. The method of forming the turbine shell 5a is described below in more detail.

Operation of the torque converter 1 will now be described below. Torque transmitted from the crankshaft of the engine is supplied to the front cover 3 through a flexible plate (not shown). The torque is then transmitted to the impeller 4 such that the front cover 3 rotates with the impeller 4. Thereby, rotation of the impeller 4 causes the working fluid to flow from the impeller 4 toward the turbine 5. Therefore, the working fluid or hydraulic oil flows from the impeller 4 to the turbine 5, which in turn causes rotation of the turbine 5. The torque of the turbine 5 is then transmitted to the main drive shaft of the transmission, which is not shown. Specifically, the flow of the working fluid acts on the turbine blade 5b and the blade-carrying portion 51 to rotate the turbine 5 so that the torque of the turbine 5 is output to the main drive shaft through the turbine hub 8 fixedly coupled to the flat portion 53. When the torque is transmitted through the hydraulic oil in this way (specifically, when the lock-up clutch 9 is released), the friction facing of the piston 22 is in contact with the friction surface of the front cover 3. Therefore, the torque from the front cover 3 is transmitted by the lock-up clutch 9 although the amount of torque being transmitted is small.

While the lock-up clutch 9 is being engaged, the hydraulic oil in the first hydraulic chamber is drained from its radially inner periphery. Then hydraulic oil is supplied to the second hydraulic chamber. The result is the hydraulic pressure in the second hydraulic chamber becomes higher compared to the hydraulic pressure in the first hydraulic chamber.

The working fluid in the torque converter 1 flows through a space between the radially inner corner portion 52 of the turbine shell 5a and the stator 6 to the outside of the torque converter 1. Accordingly, the accuracies of the size and form of the radially inner corner portion 52 are important factors determining the efficiency of the torque converter 1 (i.e., efficiency of flow of the working fluid).

Now, the method of forming the turbine shell 5a will be described below. First, a thin steel material or plate is prepared by cutting a blank flat plate into a predetermined configuration. Typically, the sheet material has a uniform thickness. Preferably, after being initially cut, the thin steel plate has a circular form with the center of the thin steel plate being provided with a central hole to accommodate the hub 8, and a plurality of circumferentially spaced holes 54 located adjacent the central hole. This cutting step can be performed by cutting the plate in a press or the like. This cutting step may be two or more steps as is necessary for attaining the desired shape. Typically at least one cutting step is required in order to attain the desired shape, although, two or more steps may be necessary. The blank flat plate can now be pressed to form a preliminary or intermediate shape.

Figure 2:
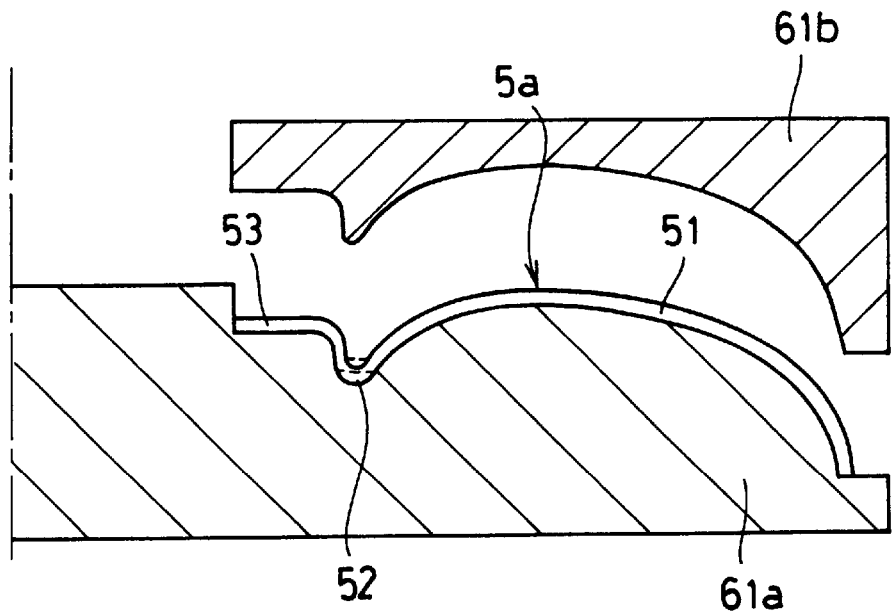
FIG. 2 is an enlarged, partial schematic cross-sectional view of the preliminary pressing step of the turbine shell which is not hatched.

As shown in FIG. 2, a pair of dies 61a and 61b are preferably used for preliminary pressing the blank flat into its preliminary or intermediate shape. The dies 61a and 61b are preferably shaped to form the blade-carrying portion 51 and the flat portion 53 in their finished form. The dies 61a and 61b are preferably shaped such that the radially inner corner portion 52 of the turbine shell 5a formed by the preliminary pressing projects toward the transmission (i.e., bottom in FIG. 2) beyond its finished form. In other words, the radially inner corner portion 52 of the turbine shell 5a has a longer size or shape than the finished size or shape of the radially inner corner portion 52 of the turbine shell 5a. The preliminary or intermediate form of the radially inner corner portion 52 of the turbine shell 5a produced by the preliminary pressing is depicted by solid lines in FIG. 2. The finished form of the radially inner corner portion 52 of the turbine shell 5a is depicted by dotted lines in FIG. 2. It will be apparent to those skilled in the art from this disclosure that this preliminary step may be two or more steps as is necessary for attaining the desired shape. Typically at least one pressing step is required in order to attain the desired shape, although, two or more steps may be necessary.

Figure 3:
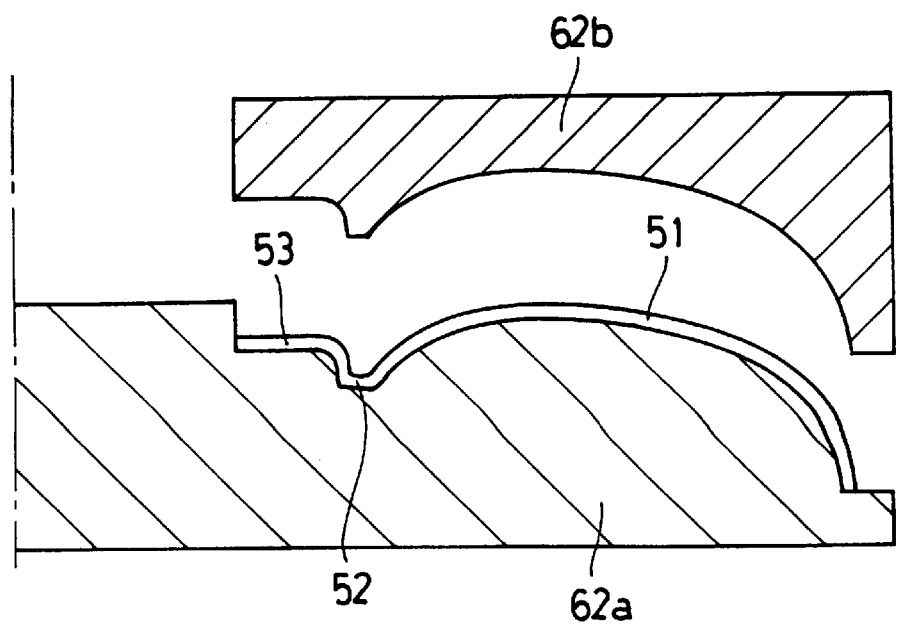
FIG. 3 is an enlarged, partial schematic cross-sectional view of the finish pressing step of the turbine shell which is not hatched.

After the radially inner corner portion 52 of the turbine shell 5a has the preliminary or intermediate form depicted by solid lines in FIG. 2, the finish pressing is performed by pressing the preliminary or intermediate form with a pair of dies 62a and 62b, as shown in FIG. 3. The finish pressing results in the finished form of the radially inner corner portion 52. In particular, as shown in FIG. 3, the die 62a is pressed downwardly against the preliminary or intermediate form of the turbine shell 5a, which is lying the die 62a.

While the turbine shell 5a is being formed in this finish forming step, a compressive force is generated within the turbine shell 5a at the radially inner corner portion 52. This compressive force is directed in a substantially perpendicular direction to the direction of the thickness of the turbine shell 5a such that the compressive force acts on and around the radially inner corner portion 52. Thus, the preliminary pressing of turbine shell 5a gathers the material, of which size is larger than the intended finished size, into the radially inner corner portion 52. The finish pressing acts on the gathered material to form the radially inner corner portion 52 of the finished form. This is accomplished by restricting the movement of the opposite ends of the material by the blade-carrying portion 51 and the flat portion 53 to hold the radially inner corner portion 52 therebetween. In other words, during the finish pressing operation, the blade-carrying portion 51 and the flat portion 53 remain stationary. The corner portion 52 is first compressed in a direction substantially parallel to the thickness of the material which generates a compressive force in a direction substantially perpendicular to the thickness of the material. Thereby, reduction in thickness due to the bending deformation is suppressed.

In this manner, the finish pressing as shown in FIG. 3 reverses the reduction in thickness of the radially inner corner portion 52 caused by the preliminary pressing. The finished thickness of the radially inner corner portion 52 is only slightly reduced from the original thickness of the sheet material or not reduced at all. Accordingly, the required thickness of the sheet material for the turbine shell 5a can be reduced without increasing the radius of the radially inner corner portion 52. Moreover, the weight of torque converter 1 can be reduced, while still ensuring the strength and rigidity of the turbine shell 5a.

It will be apparent to those skilled in the art from this disclosure that this finishing step may be two or more steps as is necessary for attaining the desired shape. Typically at least one pressing step is required in order to attain the desired shape, although, two or more steps may be necessary.

In the prior art methods, the finish pressing does not result in compressive forces acting on the radially inner corner portion 52. In the prior art torque converters, the thickness of the radially inner corner portion is reduce in thickness by 15% to 25%, when the press working occurs on a material plate of approximately 1.57 mm in thickness to form a curved portion having a radius of 2 mm. In contrast, when the same material plate having a thickness of 1.57 mm is pressed in accordance with the method discussed above to form the curved portion with a 2 mm radius, the finished portion has a thickness of approximately 1.43 mm. Thus, the thickness of the radially inner corner portion 52, which is pressed in accordance with the method set forth above, decreases only about 9%. Of course, it is desirable to have the finished thickness of the radially inner corner portion 52 as close as possible to the thickness of the original sheet material. After the preliminary pressing operation and the finish pressing operation, the finished thickness of the radially inner corner portion 52 should result in a reduction of thickness of no more than approximately 10% of the thickness of the original sheet material.

According to the invention, the step before the finish pressing is performed to provide such a form that the corner portion will be subjected to the compressive force in the direction crossing the direction of the thickness in the finish pressing. Therefore, it is possible to suppress reduction in thickness of the corner portion in the finish press step. Accordingly, the material plate which is thinner than that in the prior art can be used while maintaining the strength and the efficiency of the working fluid, and the manufacturing cost and weight of the torque converter can be reduced.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of forming a turbine shell by bending, comprising the steps of:

providing a sheet material with a predetermined uniform thickness;

cutting said sheet material in a predetermined configuration such that said sheet material has a circular form with a central hole on a center thereof and a plurality of circumferentially spaced holes located adjacent to said central hole;

performing a preliminary pressing operation on said sheet material to provide a preliminary form of said turbine shell by use of a first pair of dies, the first pair of dies shaped to form a preliminary blade-carrying portion, a preliminary flat portion, and a preliminary corner portion, said preliminary pressing operation applying a compressive force to said sheet material to form said preliminary form having a preliminary corner portion with a decreased thickness, a preliminary blade-carrying portion, and a preliminary flat portion; and performing a finish pressing operation on said sheet material to provide said turbine shell with a finished form by use of a second pair of dies, the second pair of dies shaped to form a finished blade-carrying portion, a finished flat portion, and a finished corner portion, said finish pressing operation generating a compressive force in said preliminary corner portion in a direction substantially transverse to a direction of said decreased thickness of said preliminary corner portion by restricting movement of said preliminary flat portion and said preliminary blade-carrying portion with said preliminary corner portion therebetween to form a finished form having a blade-carrying portion, a finish flat portion and a finished corner portion, said finished blade-carrying portion having the same thickness and shape as said preliminary blade-carrying portion, said finished flat portion having the same thickness and shape as said preliminary flat portion, said preliminary corner portion projecting beyond said finished corner portion, said finished corner portion having a finished thickness that is increased in thickness relative to said decreased thickness of said preliminary corner portion such that the thickness of said finished corner portion is decreased by 10% or less relative to the predetermined thickness of said sheet material.

2. The method of forming said turbine shell according to claim 1, wherein said turbine shell has an annular form, and said finished corner portion of said turbine shell is formed at a radially inner portion of said turbine shell.

3. The method of forming said turbine shell according to claim 2, wherein said turbine shell is formed of said finished corner portion, a blade-carrying portion extending radially outward from said finished corner portion, and a flat portion extending radially inward from said finished corner portion.

4. The method of forming said turbine shell according to claim 3, wherein said preliminary pressing operation forms said blade-carrying portion and said flat portion with finished forms as well as forms said preliminary corner portion with a longer size than an intended finish size.

5. The method of forming said turbine shell according to claim 4, wherein said finished corner portion of said turbine shell has a radius of no greater than approximately 2 mm.

6. The method of forming said turbine shell according to claim 4, wherein said finished thickness of said finished corner portion is reduced by no more than 10% by said preliminary pressing operation and said finish pressing operation with respect to said predetermined thickness of said sheet material.

7. The method of forming said turbine shell according to claim 3, wherein said flat portion has at least one attachment hole formed therein.

8. The method of forming said turbine shell according to claim 3, wherein said finished corner portion of said turbine shell has a radius of no greater than approximately 2 mm.

9. The method of forming said turbine shell according to claim 3, wherein said finished thickness of said finished corner portion is reduced by no more than 10% by said preliminary pressing operation and said finish pressing operation with respect to said predetermined thickness of said sheet material.

10. The method of forming said turbine shell according to claim 2, wherein said finished corner portion of said turbine shell has a radius of no greater than approximately 2 mm.

11. The method of forming said turbine shell according to claim 10, wherein said finished thickness of said finished corner portion is reduced by no more than 10% by said preliminary pressing operation and said finish pressing operation with respect to said predetermined thickness of said sheet material.

12. The method of forming said turbine shell according to claim 2, wherein said finished thickness of said finished corner portion is reduced by no more than 10% by said preliminary pressing operation and said finish pressing operation with respect to said predetermined thickness of said sheet material.

13. The method of forming said turbine shell according to claim 1, wherein said finished corner portion of said turbine shell has a radius of no greater than approximately 2 mm.

14. The method of forming said turbine shell according to claim 13, wherein said finished thickness of said finished corner portion is reduced by no more than 10% by said preliminary pressing operation and said finish pressing operation with respect to said predetermined thickness of said sheet material.

15. The method of forming said turbine shell according to claim 1, wherein said finished thickness of said finished corner portion is reduced by no more than 10% by said preliminary pressing operation and said finish pressing operation with respect to said predetermined thickness of said sheet material.

* * * * *

UNITED STATES PATENT AND TRADEMARK OFFICE
CERTIFICATE OF CORRECTION

PATENT NO.     : 6,053,024
DATED          : April 25, 2000
INVENTOR(S)    : Satoshi Yoshida It is certified that error appears in the above-identified patent and that said Letters Patent is hereby corrected as shown below:

<u>Title page,</u>
Add the heading Foreign Application Priority Data and list the following:
"Sep. 8, 1997   [JP]   Japan..........................9-243081"

Signed and Sealed this

Twenty-eighth Day of May, 2002

Attest:

*Attesting Officer*

JAMES E. ROGAN
*Director of the United States Patent and Trademark Office*